T. Noel.
Spectacle Frame.
No. 22,572.   Patented Jan. 11, 1859.
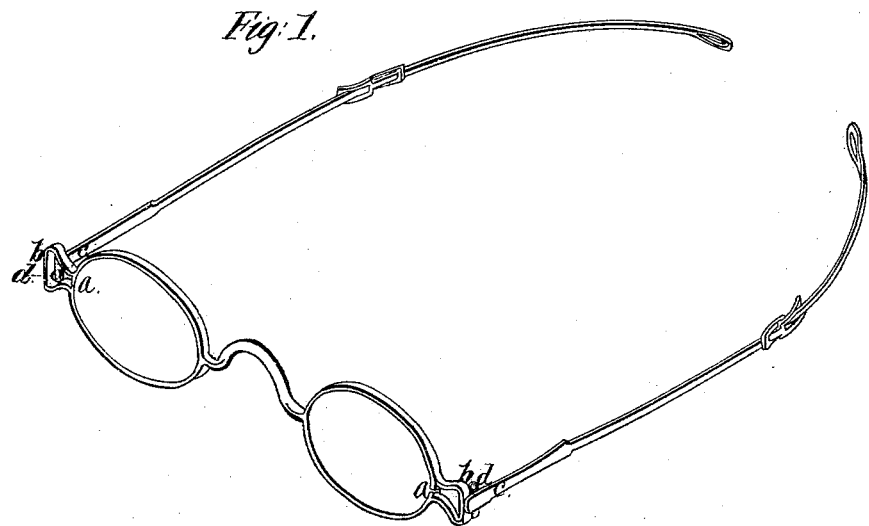
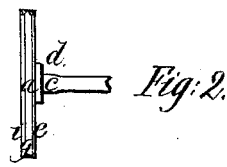
Witnesses:
William B. Wiggs
Patrick I. Hartley
Inventor:
Theodore Noel

UNITED STATES PATENT OFFICE.

THEODORE NOEL, OF MEMPHIS, TENNESSEE.

SPECTACLE-FRAME.

Specification forming part of Letters-Patent No. 22,572, dated January 11, 1859; Reissued November 9, 1869, No. 3,725.

*To all whom it may concern:*

Be it known that I, THEODORE NOEL, of Memphis, in the county of Shelby and State of Tennessee, have invented a new and useful Improvement in Spectacle-Frames; and I do hereby declare that the following is a full, clear, and exact description of the same, reference being had to the accompanying drawings, making part of this specification, in which—

Figure 1, is a perspective view of a pair of spectacles, with my improved frame. Fig. 2, is a transverse section of one of the eye pieces of the same.

Similar letters of reference indicate corresponding parts in both figures.

The object of my invention is to simplify the construction of the frames of spectacles, and give them a lighter and more graceful appearance, and also to facilitate the insertion and removal of the glasses, so that two or more pairs of glasses may be used with the same frame and one pair changed for another as occasion may require.

My invention consists in the employment of springs applied in such manner to the frames in the place commonly occupied by the joint pieces and clamping screws, that said springs by their elasticity will hold the eye-pieces closed upon the glasses and cause the glasses to be confined in place till it is desired to remove them, when said springs permit the eye-pieces to be sprung open far enough to permit the removal.

To enable others skilled in the art to make and use my invention, I will proceed to describe its construction and operation.

In carrying out my invention, I construct the frames in their general form like those in common use, always preferring to make the eyepieces oval, and beveled from the outside down to the groove which receives the glass; and I leave the usual openings in the eyepieces, as shown at *a, a,* in Fig. 1, at the place commonly occupied by the joint pieces. The springs *b, b,* whose employment constitutes my invention, consist each of a piece of light flattened wire or strip of suitable metal curved to a form substantially such as is represented in Fig. 1, or in such other form as will enable its extremities to be soldered to one of the eyepieces on opposite sides of the opening *a,* and will permit it when thus attached to have the required elasticity to make the eyepieces clasp the glasses tightly enough to confine them in place, and will also afford convenience for the attachment of one of the temple pieces *c, c,* by a hinge *d.* These springs are soldered to the eyepieces close to or near the openings *a, a.* The hinges *d, d,* for the temple pieces, are partly soldered to or formed upon the springs *b, b,* and partly soldered to or formed upon the temple pieces, and fitted with pins or rivets in the usual way; the parts of the hinges soldered to or formed upon the temple pieces being so arranged that the extremities of the temple pieces constitute stops which act against the springs *b, b,* to prevent the temple pieces opening too far.

To permit the glasses to be removed and replaced easily, the eyepieces should have a very shallow bezel on that side on which the glasses are introduced and removed, preferably the inner side or side next the face, and the said bezel may be shallowest near the openings *a, a.* Fig. 2 exhibits the inside bezel *e,* shallower than the outside one *i.*

To insert a glass, first put the end next the nose piece in its place and then, holding the frame and glass between the thumbs and fingers of both hands with the temple pieces upward, apply gentle pressure near the opening *a,* to draw the glass and eyepiece together, and the eyepiece yields to the glass which slips over the bezel *e,* into the groove *g.* To remove the glass, hold the frame in the position last mentioned, and draw open the eyepiece very gently, while forcing the glass up with the tips of the fingers.

The springs may be made of any metal which is sufficiently elastic. For steel frames, they may be of steel; for gold frames, of gold from 12 to 16 carats fine; and for silver frames, of a very low carat gold.

Besides simplifying the construction of the frames and giving them a lighter and more elegant appearance, and facilitating the changing of the glasses, the springs $b$, $b$, afford greater facility for the renewal of the glasses after breakage than when the screw-joints are employed, for in many cases the screws become so corroded as to be immovable without destruction or injury to themselves or the frame, while the springs remain effective for any length of time.

What I claim as my invention and desire to secure by Letters-Patent, is:—

The employment of springs $b$, $b$, applied to the frame substantially as and for the purposes herein specified.

THEODORE NOEL.

Witnesses:
　WILLIAM B. WIGGS,
　PATRICK I. HARTLEY.

[FIRST PRINTED 1911.]